US012636947B2

(12) United States Patent
Kim

(10) Patent No.: US 12,636,947 B2
(45) Date of Patent: May 26, 2026

(54) AIR FLAP APPARATUS FOR VEHICLES

(71) Applicant: HYUNDAI MOBIS CO., LTD., Seoul (KR)

(72) Inventor: In Cheol Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 266 days.

(21) Appl. No.: 18/521,050

(22) Filed: Nov. 28, 2023

(65) Prior Publication Data

US 2025/0042242 A1     Feb. 6, 2025

(30) Foreign Application Priority Data

Aug. 1, 2023     (KR) ........................ 10-2023-0100545

(51) Int. Cl.
B60K 1/04     (2019.01)
B60K 11/08     (2006.01)
B62D 35/00     (2006.01)

(52) U.S. Cl.
CPC .......... B60K 11/085 (2013.01); B62D 35/005 (2013.01)

(58) Field of Classification Search
CPC .. B60K 11/05; B62D 35/005; B60Y 2400/41; B60Y 2400/414
See application file for complete search history.

(56) References Cited

U.S. PATENT DOCUMENTS

| | | | | |
|---|---|---|---|---|
| 12,391,112 | B2 * | 8/2025 | Kim | B60K 11/085 |
| 12,409,724 | B2 * | 9/2025 | Park | B60K 11/085 |

* cited by examiner

*Primary Examiner* — Jason D Shanske
*Assistant Examiner* — James J Triggs
(74) *Attorney, Agent, or Firm* — NSIP Law

(57) ABSTRACT

An air flap apparatus for a vehicle includes a frame disposed behind a grille of a vehicle, the frame including an air inlet, an air flap including a first main body for opening and closing the air inlet, links disposed at both sides of the air flap and coupled to the air flap; and a loader connected to the air flap through the links. The air flap is disposed at a position where the air flap is rotated to open the air inlet when moved along the links and coupled to the loader, or at a position where the air flap is rotated to close the air inlet when moved along the links and decoupled from the loader.

15 Claims, 10 Drawing Sheets

AIR FLAP APPARATUS FOR VEHICLES

CROSS-REFERENCE TO RELATED APPLICATION

This application claims the benefit under 35 USC § 119(a) of Korean Patent Application No. 10-2023-0100545 filed on Aug. 1, 2023, in the Korean Intellectual Property Office, the entire disclosures of which are hereby incorporated herein by reference for all purposes.

BACKGROUND

1. Field

The present invention relates to an air flap apparatus for vehicles.

2. Description of Related Art

In order to stably operate various heat exchangers in an engine compartment of a vehicle, external air has to be smoothly supplied into the engine compartment. However, when the vehicle travels at high speed, a large amount of external air is introduced at high speed, and thus air resistance becomes very large. Thereby, there is a problem that fuel efficiency of the vehicle drops.

In order to solve the problem, an air flap apparatus capable of helping improve fuel efficiency by introducing driving wind, which is about to flow toward the engine compartment through a grille installed in front of the engine compartment of the vehicle, into the engine compartment or blocking the flow of the driving wind into the engine compartment has been developed.

This air flap apparatus may include an air flap, a power transmission unit that generates power to rotate the air flap, a loader that is rotated by being connected to the power transmission unit, and a link that connects the air flap and the loader and rotates the air flap while being moved by the loader.

However, in an air flap apparatus in the related art, since the link connects the air flap and the loader, the link transmits a rotational force of the loader to the air flap. Thereby, a power transmission time is increased, and thus there is a problem in that the air flap does not rotate as much as the loader rotates. Therefore, the driving wind is not constantly introduced into the engine compartment, and thus a problem that cooling of the engine compartment is not smoothly performed occurs.

In addition, in the air flap apparatus in the related art, since the link connects the air flap and the loader, when vibration is generated in the link, the vibration is transmitted to the air flap through the link, and thus a problem of the air flap shaking occurs. Therefore, the stability of the air flap may be lowered.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, an air flap apparatus for a vehicle includes: a frame disposed behind a grille of a vehicle, the frame including an air inlet; an air flap including a first main body for opening and closing the air inlet; links disposed at both sides of the air flap and coupled to the air flap; and a loader connected to the air flap through the links, wherein the air flap is disposed at a position where the air flap is rotated to open the air inlet when moved along the links and coupled to the loader, or a position where the air flap is rotated to close the air inlet when moved along the links and decoupled from the loader.

The air flap apparatus may include: a first side protrusion in which a first coupling groove coupled to the loader is formed; a second side protrusion spaced apart from the first side protrusion and rotatably coupled to the link; and a connecting plate connecting the first side protrusion and the second side protrusion and having a second coupling groove connected to the first coupling groove.

The loader may include: a coupling shaft that is in contact with or separated from the first coupling groove in conjunction with the movement of the links; and a power shaft disposed outside the coupling shaft and for rotating the coupling shaft.

A rotation center of the air flap may coincide with a rotation center of the coupling shaft when the first side protrusion of the air flap is coupled to the coupling shaft of the loader.

The frame may include: a first guide hole supporting the coupling shaft of the loader and guiding a movement direction of the first side protrusion of the air flap; and a second guide hole guiding a movement direction of the second side protrusion of the air flap.

The second guide hole may include: a straight portion guiding a straight movement of the second side protrusion of the air flap that moves in conjunction with the movement of the links in a state where the air flap closes the air inlet; and a curved portion connected to the straight portion and guiding a curved movement of the second side protrusion after the first side protrusion of the air flap is coupled to the coupling shaft of the loader.

The straight portion of the second guide hole may include: a first region in which the second side protrusion of the air flap is disposed in a state where the air flap closes the air inlet; and a second region connected to the curved portion of the second guide hole and disposed at a position where the first side protrusion of the air flap is coupled to the coupling shaft of the loader when the second side protrusion of the air flap is disposed.

The loader may include a stopper formed integrally with the coupling shaft and blocking movement of the first side protrusion of the air flap.

The links may include: a second main body; a support hole disposed on one side of the second main body and supporting the second side protrusion of the air flap; and a third side protrusion disposed on another side of the second main body and rotatably supported by the loader.

The links may move by being pressed by the loader that is rotated.

In another aspect of the disclosure, an air flap apparatus for a vehicle includes: a frame including an air inlet; an air flap for opening and closing the air inlet; a pair of links respectively coupled to the air flap at opposing sides thereof; a loader connected to the links; a power transmission connectable to the loader; and a processor configured to control the power transmission to actuate the loader to move the links to move the air flap to open or close the air inlet, wherein, at a first position, the air inlet is opened by the air flap, and the loader is coupled to the loader, and wherein, at a second position, the air inlet is closed by the air flap, and the loader is decoupled to the loader.

The air flap apparatus may further include a sensor for detecting air resistance at the air inlet.

The processor may further be configured to control the air flap to move between the first position and the second position based on the detected air resistance, moving speed of the vehicle, or a combination thereof.

The air flap may include: a first side protrusion in which a first coupling groove coupled to the loader is formed; a second side protrusion spaced apart from the first side protrusion and rotatably coupled to the link; and a connecting plate connecting the first side protrusion and the second side protrusion, the connecting plate including a second coupling groove connected to the first coupling groove.

The loader may include: a coupling shaft detachably coupled to the first coupling groove; and a power shaft disposed outside the coupling shaft for rotating the coupling shaft.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is a view illustrating a first guide hole;

FIG. 7 is a view illustrating a state where a first side protrusion of the air flap is spaced apart from a coupling shaft of the loader.

DETAILED DESCRIPTION

Figure 1:
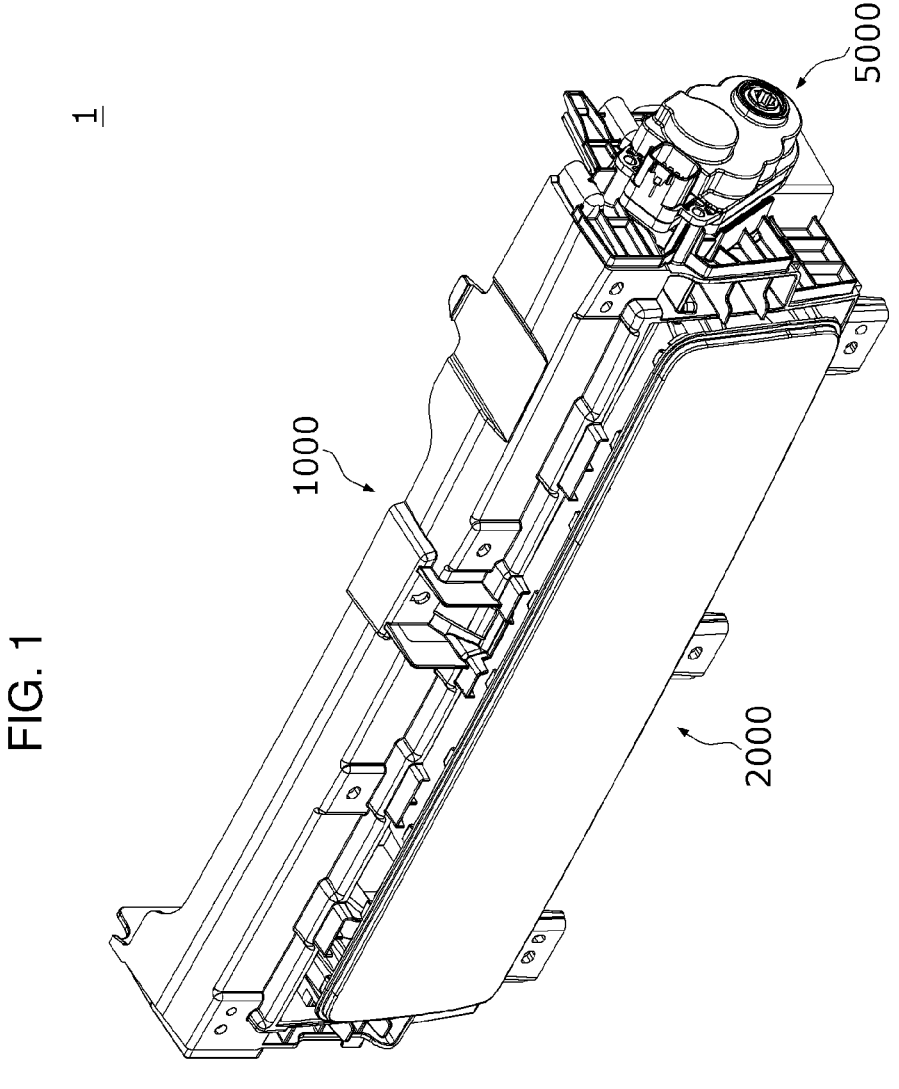
FIG. 1 is a perspective view of an air flap apparatus for vehicles according to one embodiment of the present invention.

Since the present invention may be variously modified and embodied, particular embodiments thereof will be illustrated in the drawings and described. However, this is not intended to limit the present invention to the specific embodiments, and it should be understood to include all modifications, equivalents, and substitutes included in the spirit and scope of the present invention.

Although the terms including ordinal numbers such as first, second, or the like, may be used to describe various elements, these elements are not limited by these terms. These terms are only used to distinguish one element from another element. For example, without departing from the scope of the present invention, a second element could be called a first element, and similarly, a first element could be called a second element. The term "and/or" includes a combination of a plurality of related listed items or any of a plurality of related listed items.

It will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there may be no intervening elements present.

In the description of embodiments, when one element is described as being formed "on" or "under" another element, "on" or "under" includes both a case in which the two elements are directly in contact with each other and a case in which at least one additional element is formed to be disposed between the two elements (indirectly). Further, when expressed as "on or under", the expression may include the meaning of not only an upward direction but also a downward direction based on one element.

The terms used in the present application are merely provided to describe specific embodiments, and are not intended to limit the present invention. The singular forms are intended to include the plural forms as well, unless the context clearly indicates otherwise. In the present application, it will be further understood that the terms "includes" and/or "have", when used in this specification, specify the presence of stated features, integers, steps, operations, elements, components, and/or combinations thereof, but do not preclude the possibility of the presence or addition of one or more other features, integers, steps, operations, elements, components, or combinations thereof.

Unless otherwise defined, all terms used herein, including technical or scientific terms, have the same meaning as commonly understood by those of ordinary skill in the art to which the present invention may belong. Terms, such as those defined in commonly used dictionaries, should be interpreted as having a meaning that is consistent with their meaning in the context of the related art and will not be interpreted in an idealized or overly formal sense unless expressly so defined herein.

Hereinafter, an air flap apparatus for vehicles will be described in detail with reference to the accompanying drawings, but identical or corresponding components are denoted by the same reference numerals regardless of figure numbers, and redundant descriptions thereof will be omitted.

Figure 2:
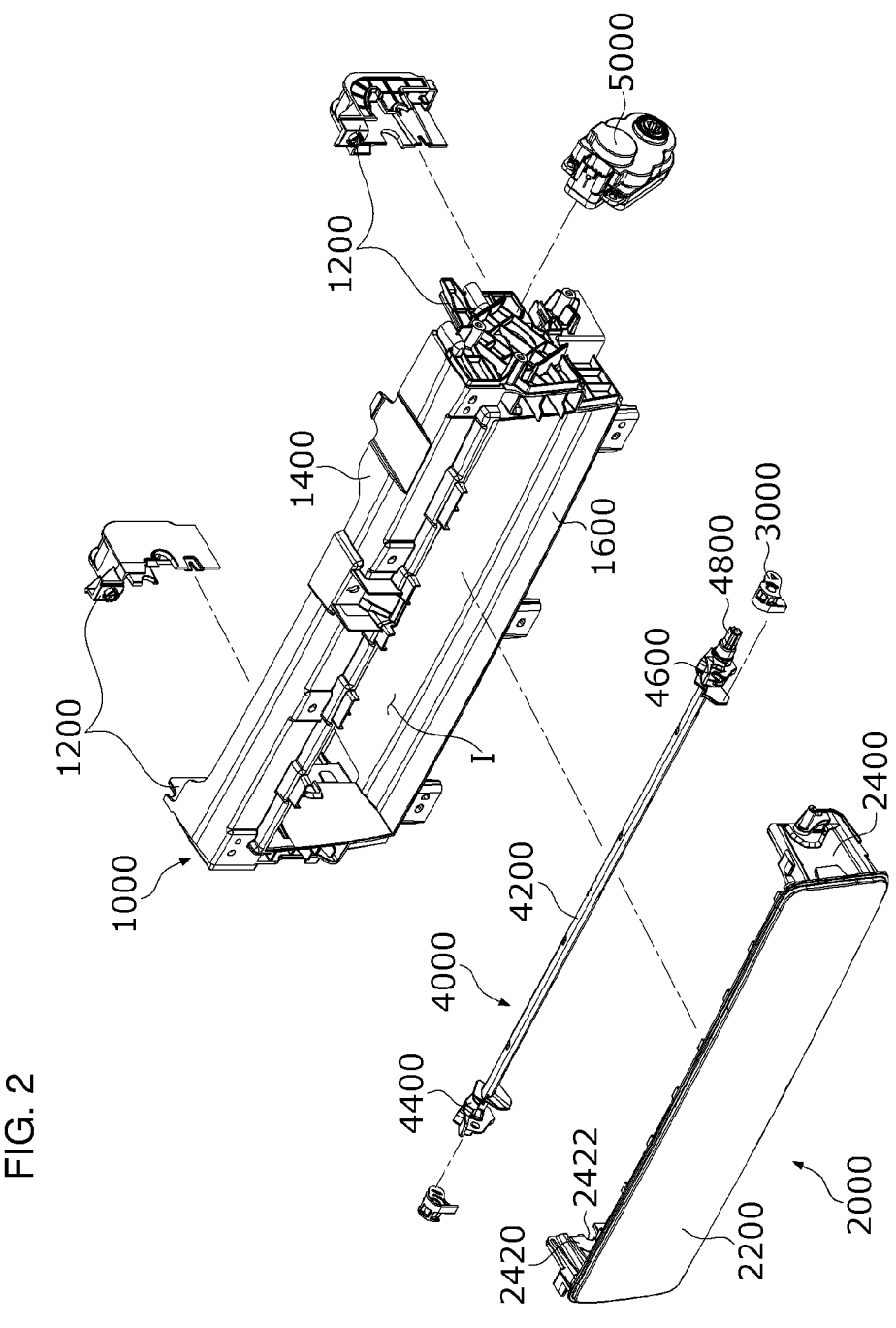
FIG. 2 is an exploded perspective view of the air flap apparatus for vehicles according to one embodiment of the present invention.
Figure 3:
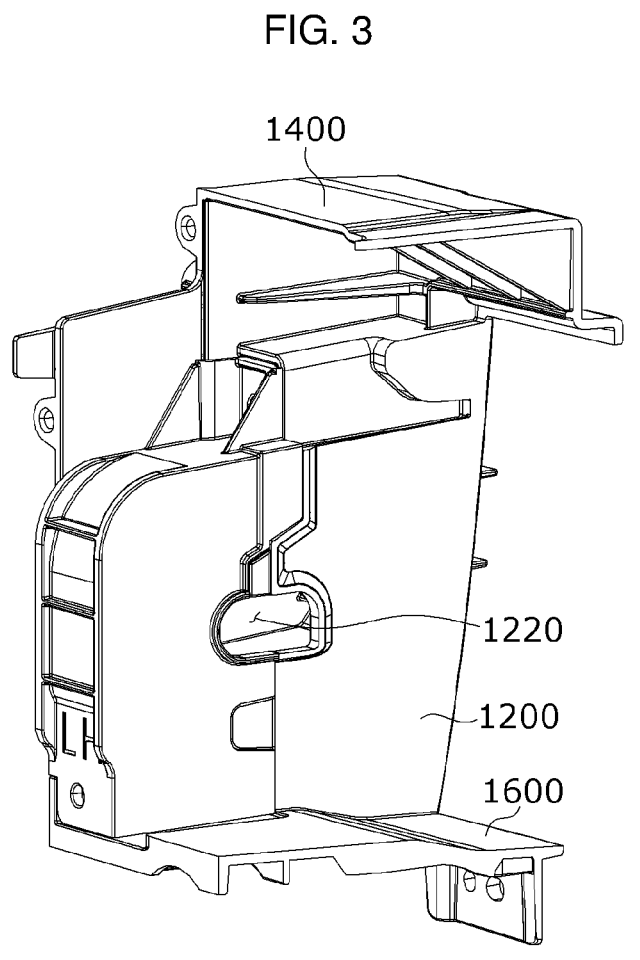
Figure 4:
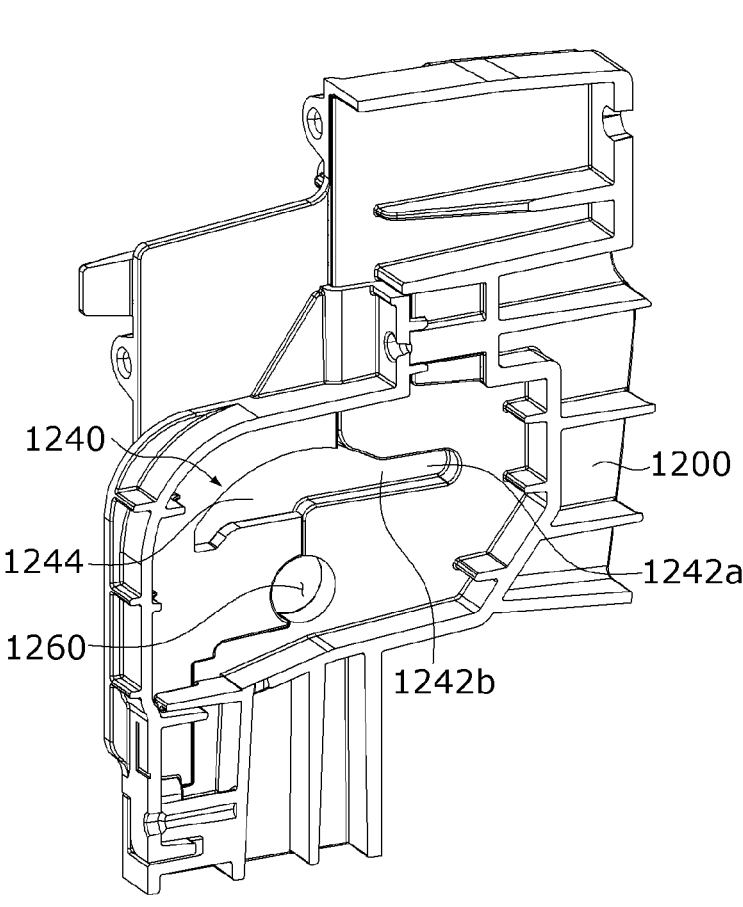
FIG. 4 is a view illustrating a second guide hole and a third guide hole.
Figure 5:
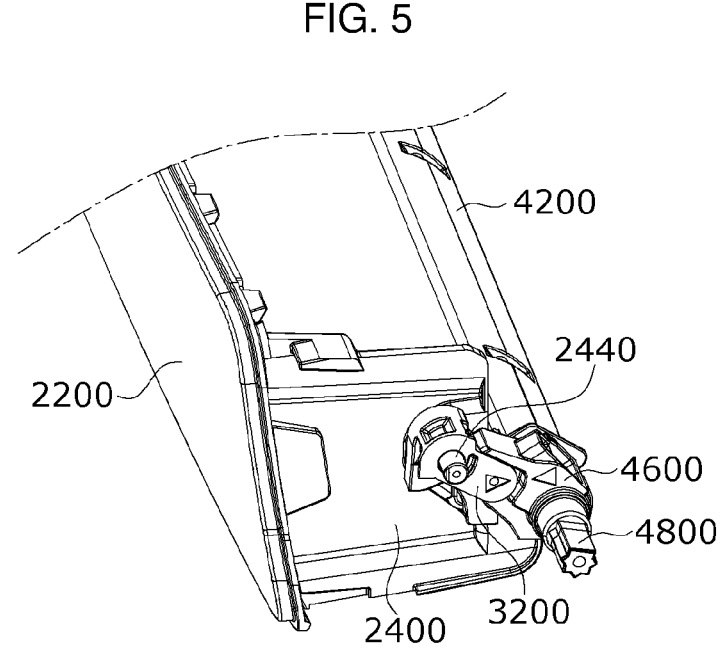
FIG. 5 is a view illustrating a state where an air flap, a link, and a loader are coupled to each other.
Figure 6:
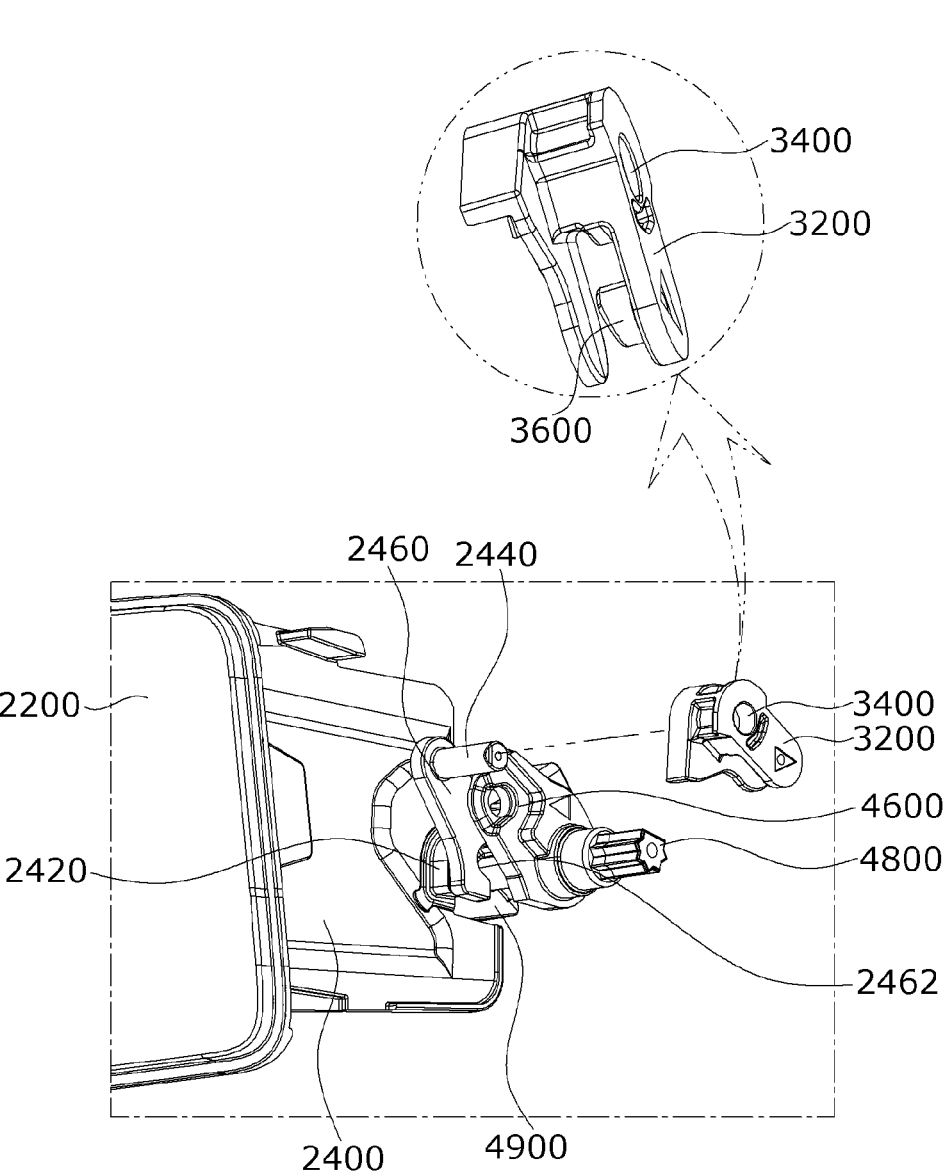
FIG. 6 is a view illustrating a state where the link is separated from the air flap and the loader.
Figure 7:
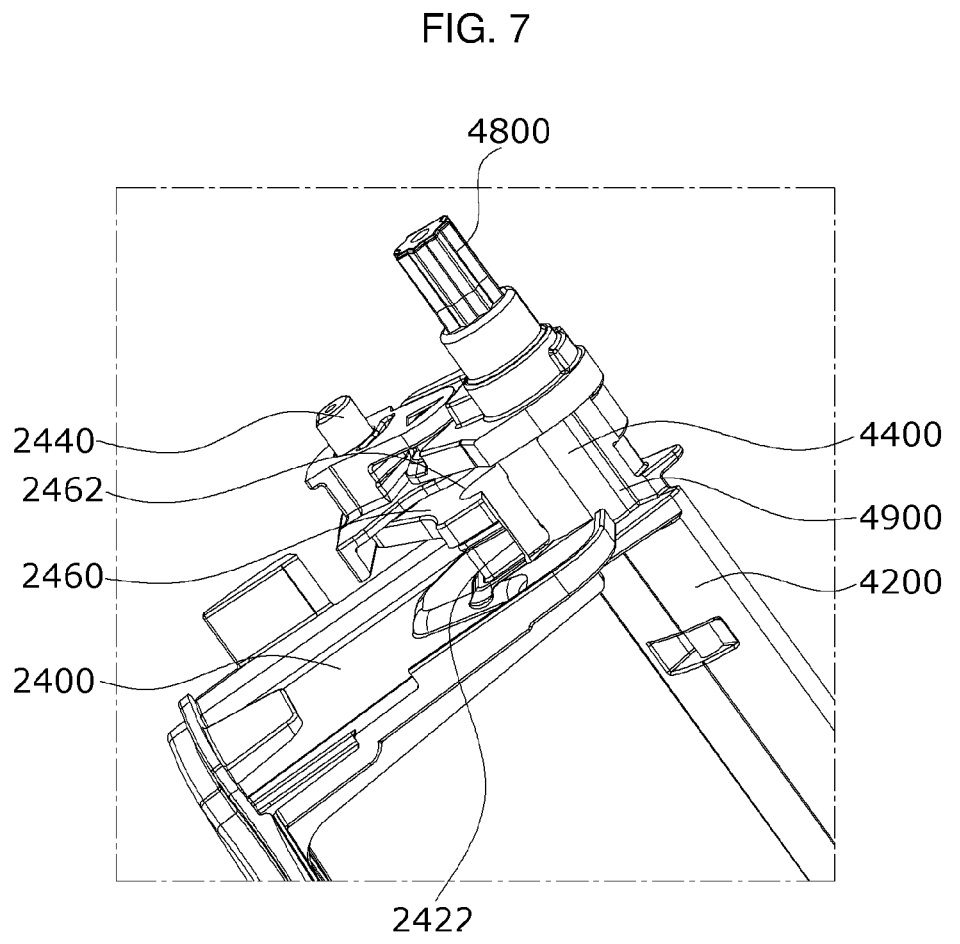

FIG. 1 is a perspective view of an air flap apparatus for vehicles according to one embodiment of the present invention, FIG. 2 is an exploded perspective view of the air flap apparatus for vehicles according to one embodiment of the present invention, FIG. 3 is a view illustrating a first guide hole, FIG. 4 is a view illustrating a second guide hole and a third guide hole, FIG. 5 is a view illustrating a state where an air flap, a link, and a loader are coupled to each other, FIG. 6 is a view illustrating a state where the link is separated from the air flap and the loader, and FIG. 7 is a view illustrating a state where a first side protrusion of the air flap is spaced apart from a coupling shaft of the loader.

Referring to FIGS. 1 to 7, an air flap apparatus for vehicles 1 according to one embodiment of the present invention includes a frame 1000 disposed behind a grille of a vehicle, an air flap 2000 including a first main body 2200 for opening and closing an air inlet I formed in the frame 1000, links 3000 disposed on both sides of the air flap 2000 and coupled to the air flap 2000, a loader 4000 connected to the air flap 2000 through the links 3000, and a power transmission unit 5000. In this embodiment, the term "front" may mean a direction from a passenger compartment (not illustrated) of the vehicle to an engine compartment (not illustrated) thereof, and the term "rear" may mean a direction from the engine compartment of the vehicle to the passenger compartment thereof.

The frame 1000 may be disposed in the engine compartment. The frame 1000 may have a rectangular frame shape, and may have a hollow shape so that the air flap 2000 may be disposed therein. The air inlet I for introducing air (driving wind) introduced through the grille of the vehicle into the engine compartment may be formed in the frame 1000. The frame 1000 may include side portions 1200, a top portion 1400, and a bottom portion 1600.

The side portion 1200 may be disposed between the top portion 1400 and the bottom portion 1600. The side portions 1200 may be disposed on both sides of the top portion 1400 and the bottom portion 1600. That is, a plurality of side portions 1200 may be provided. The side portion 1200 may be configured as a combination of two hollow parts. The side portion 1200 may accommodate a portion of the air flap 2000, the link 3000, and a portion of the loader 4000 therein. The side portion 1200 may be configured as a combination of two plates spaced apart from each other and a plate disposed between the two plates to connect the two plates. The side portion 1200 may include a first guide hole 1220, a second guide hole 1240, and a third guide hole 1260.

As illustrated in FIG. 3, the first guide hole 1220 may be formed in one plate that does not face the frame 1000 among the two plates constituting the side portion 1200. The first guide hole 1220 may support a coupling shaft 4400 of the loader 4000, which will be described below. The first guide hole 1220 may guide a movement direction of a first side protrusion 2420 of the air flap 2000, which will be described below. That is, the first guide hole 1220 may movably support the first side protrusion 2420 of the air flap 2000. The first guide hole 1220 may have an elongated hole shape.

The second guide hole 1240 may guide a movement direction of a second side protrusion 2440 of the air flap 2000, which will be described below. With reference to FIGS. 3 and 4, the second guide hole 1240 may be disposed above the first guide hole 1220. The second guide hole 1240 may include a straight portion 1242 and a curved portion 1244.

The straight portion 1242 may have an elongated hole shape. The straight portion 1242 may introduce a straight movement of the second side protrusion 2440 of the air flap 2000 moving in conjunction with the movement of the link 3000 in a state where the air flap 2000 closes the air inlet I. That is, the straight portion 1242 may movably support the second side protrusion 2440 of the air flap 2000. The straight portion 1242 may include a first region 1242a and a second region 1242b.

Figure 8:
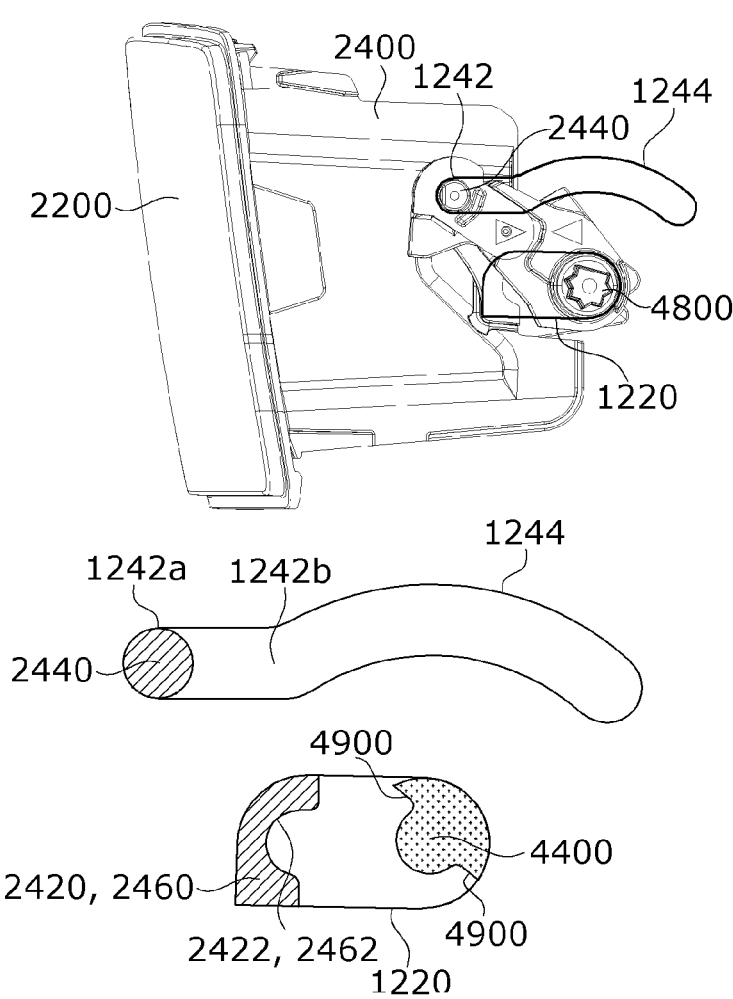
FIGS. 8, 9 and 10 are views illustrating a process in which an air flap is rotated.

The first region 1242a may be a region where the second side protrusion 2440 of the air flap 2000, which will be described below, is disposed in the state where the air flap 2000 closes the air inlet I. That is, as illustrated in FIG. 8, the first region 1242a may movably support the second side protrusion 2440.

The second region 1242b may be connected to the curved portion 1244. The second region 1242b may be a region disposed at a position where the first side protrusion 2420 of the air flap 2000 is coupled to the coupling shaft 4400 of the loader 4000 when the second side protrusion 2440 of the air flap 2000 is disposed. That is, the second region 1242b may be a final section in which the second side protrusion 2440, moved by being drawn by the first side protrusion 2420 moved along the first guide hole 1220, is able to straightly move.

The curved portion 1244 may be connected to the straight portion 1242. The curved portion 1244 may have a curved shape in one region. The curved portion 1244 may introduce a curved movement of the second side protrusion 2440 after the first side protrusion 2420 of the air flap 2000, which will be described below, is coupled to the coupling shaft 4400 of the loader 4000, which will be described below. That is, the second side protrusion 2440 of the air flap 2000, which will be described below, may be movably disposed on the curved portion 1244. The curved portion 1244 has an arc shape, and the center of the curved portion 1244 may coincide with the center of the third guide hole 1260, but is not limited thereto.

The third guide hole 1260 may be disposed below the second guide hole with reference to FIG. 4. The third guide hole 1260 may have a circular shape, but is not limited thereto. The third guide hole 1260 may rotatably support a portion of a power shaft 4800 of the loader 4000, which will be described below.

The top portion 1400 and the bottom portion 1600 may be respectively disposed at ends of the side portion 1200. The top portion 1400 and the bottom portion 1600 may be supported by the side portions 1200. The top portion 1400 and the bottom portion 1600 may form the air inlet I together with the side portions 1200.

The air flap 2000 may be disposed inside the frame 1000. The air flap 2000 may be disposed at a position capable of opening and closing the air inlet I. The air flap 2000 may include the first main body 2200 and leg portions 2400.

The first main body 2200 may be a rectangular plate. The first main body 2200 may be disposed along a direction in which the plurality of side portions 1200 are disposed. The first main body 2200 may open and close the air inlet I while being rotated by the leg portions 2400.

The leg portions 2400 may be disposed on both sides of the first main body 2200. The leg portions 2400 may support the first main body 2200. The leg portions 2400 may be disposed inside the frame 1000. The leg portion 2400 may include a support part and a rotation part.

The support part may have a shape bent from the first main body 2200. The support part may be integral with the first main body 2200. The support part may support the rotation part.

The rotation part may be disposed on the support part. The rotation part may rotate the first main body 2200 and the support part. The first side protrusion 2420, the second side protrusion 2440, and a connecting plate 2460 may be included.

The first side protrusion 2420 may protrude from the support part. The first side protrusion 2420 may be disposed outside the support part. The first side protrusion 2420 may be movably disposed in the first guide hole 1220 of the frame 1000. The first side protrusion 2420 may include a first coupling groove 2422.

The first coupling groove 2422 may be formed on the first side protrusion 2420. The first coupling groove 2422 may have a semicircular shape, but is not limited thereto. The first coupling groove 2422 may accommodate the coupling shaft 4400 of the loader 4000, which will be described below. The first coupling groove 2422 may serve as a medium connecting the first side protrusion 2420 and the coupling shaft 4400.

The second side protrusion 2440 may be disposed to be spaced apart from the first side protrusion 2420. The second side protrusion 2440 may be disposed outside the support part. The second side protrusion 2440 may protrude from the support part. The second side protrusion 2440 may have a cylindrical shape, but is not limited thereto. The second side protrusion 2440 may be rotatably coupled to the link 3000. More specifically, the second side protrusion 2440 may be rotatably supported by a support hole 3400 of the link 3000, which will be described below.

The connecting plate 2460 may connect the first side protrusion 2420 and the second side protrusion 2440. More specifically, the connecting plate 2460 may support the first side protrusion 2420 and the second side protrusion 2440. In this case, the connecting plate 2460 may be disposed in front of the first side protrusion 2420 and behind the second side protrusion 2440. The connecting plate 2460 may move the second side protrusion 2440 so that the second side protrusion 2440 moves in the same way as the first side protrusion 2420 moving in conjunction with the rotation of the loader 4000. The connecting plate 2460 may include a second coupling groove 2462.

The second coupling groove 2462 may be concavely formed from one surface of the connecting plate 2460. The second coupling groove 2462 may be connected to the first coupling groove 2422. The second coupling groove 2462 may accommodate the coupling shaft 4400 of the loader 4000, which will be described below, together with the first coupling groove 2422.

The link 3000 may be connected to the air flap 2000 and move the air flap 2000 through force generated according to rotation of the loader 4000. The link 3000 may include a second main body 3200, the support hole 3400, and a third side protrusion 3600.

The second main body 3200 may be constituted by a combination of a plurality of plates and a block connecting the plurality of plates. The second main body 3200 may support the support hole 3400 and the third side protrusion 3600.

The support hole 3400 may be disposed on one side of the second main body 3200. The support hole 3400 may have a circular shape. The support hole 3400 may support the second side protrusion 2440 of the air flap 2000. The second side protrusion 2440 supported by the support hole 3400 may be rotated inside the support hole 3400.

The third side protrusion 3600 may be disposed on the other side of the second main body 3200. The third side protrusion 3600 may be rotatably supported by the loader 4000.

The link 3000 may be moved by being pressed by the loader 4000 that is rotated. More specifically, when the loader 4000 is rotated, the third side protrusion 3600 may move while being pressed by the loader 4000. When the third side protrusion 3600 is moved, the second side protrusion 2440 supported by the support hole 3400 may be moved along the second main body 3200. Through the link 3000, the air flap 2000 may be rotated with fewer parts. Thus, manufacturing costs may be reduced.

The loader 4000 may be connected to the power transmission unit 5000. The loader 4000 may be rotated by power generated by the power transmission unit 5000. The loader 4000 may include a main shaft 4200, a coupling shaft 4400, a connecting portion 4600, a power shaft 4800, and a stopper 4900.

The main shaft 4200 may be disposed between the plurality of leg portions 2400 of the air flap 2000. The main shaft 4200 may transmit a rotational force of the power shaft 4800 disposed close to any one of the plurality of leg portions 2400 of the air flap 2000 to the coupling shaft 4400 disposed close to the other one of the plurality of leg portions 2400 of the air flap 2000.

The coupling shaft 4400 may be disposed at each of both ends of the main shaft 4200. The coupling shaft 4400 may protrude from each of both ends of the main shaft 4200 along an axial direction of the main shaft 4200. The coupling shaft 4400 may be integral with the main shaft 4200. The coupling shaft 4400 may come into contact with or may be separated from the first coupling groove 2422 in conjunction with the movement of the link 3000. The coupling shaft

4400 may be disposed in the first guide hole 1220 of the frame 1000. The coupling shaft 4400 may be rotated according to the rotation of the power shaft 4800 inside the first guide hole 1220.

The connecting portion 4600 may be disposed outside the coupling shaft 4400. The connecting portion 4600 may be disposed between the coupling shaft 4400 and the power shaft 4800. The connecting portion 4600 may rotatably support the third side protrusion 3600 of the link 3000. When the power shaft 4800 is rotated, the connecting portion 4600 may press the third side protrusion 3600 of the link 3000 while being rotated along the power shaft 4800.

The power shaft 4800 may be disposed outside the connecting portion 4600. The power shaft 4800 may have a side shape corresponding to the shape of gear teeth. The power shaft 4800 may be connected to the power transmission unit 5000. The power shaft 4800 may be rotated by power generated from the power transmission unit 5000. The power shaft 4800 may rotate the coupling shaft 4400.

The stopper 4900 may be integrally formed with the coupling shaft 4400. The stopper 4900 may wrap a portion of the coupling shaft 4400. The stopper 4900 may be disposed inside the first guide hole 1220.

Figure 9:
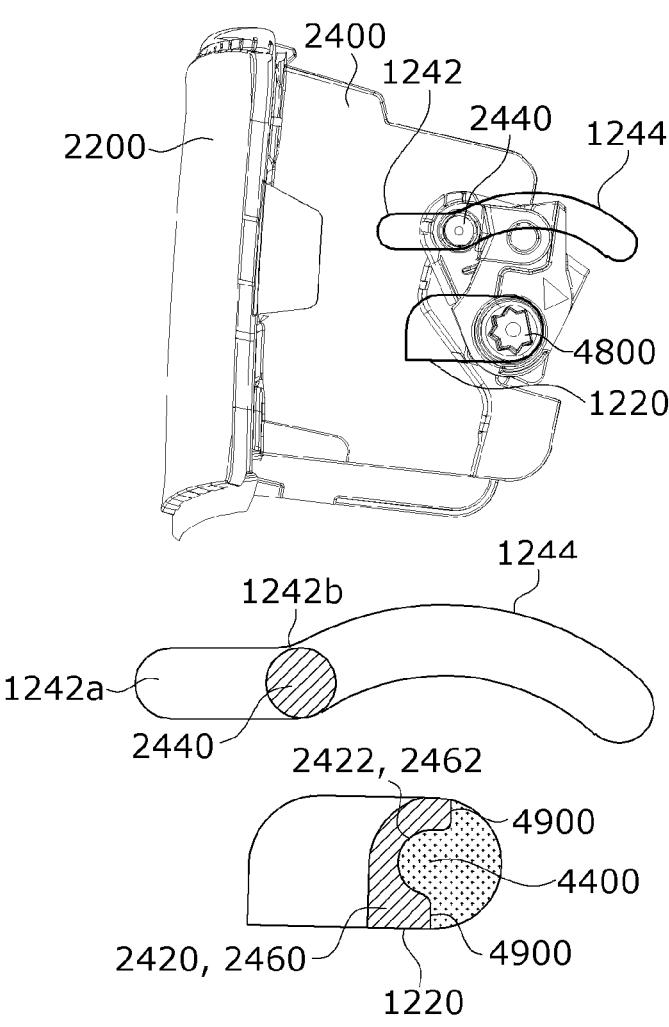
Figure 10:
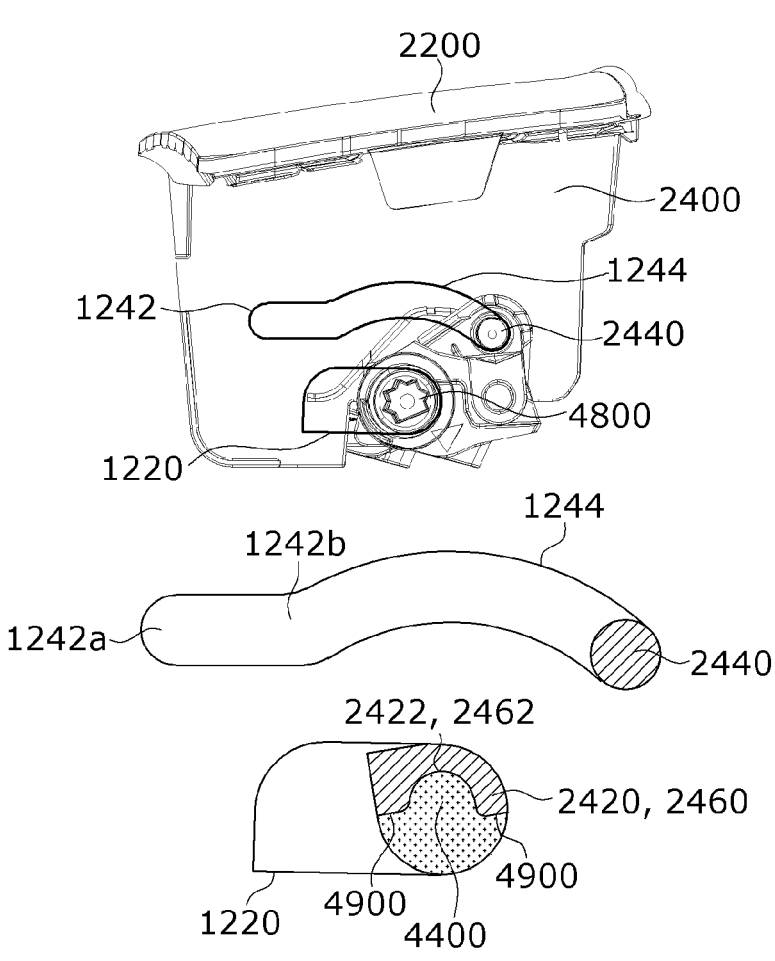

As illustrated in FIGS. 8 to 10, the stopper 4900 may support a portion of the first side protrusion 2420 and the connecting plate 2460 of the air flap 2000 by coming into contact with the portion of the first side protrusion 2420 and the connecting plate 2460. Accordingly, the stopper 4900 may block movement of the portion of the first side protrusion 2420 and the connecting plate 2460 of the air flap 2000. The stopper 4900 may transmit a rotational force generated when the coupling shaft 4400 is rotated to the air flap 2000.

As illustrated in FIGS. 8 to 10, when the first side protrusion 2420 of the air flap 2000 is coupled to the coupling shaft 4400 of the loader 4000, a rotation center of the air flap 2000 may coincide with a rotation center of the coupling shaft 4400. Such a coupling structure of the air flap 2000 and the loader 4000 may prevent over-rotation of the air flap 2000, thereby preventing an increase in the opening and closing time of the air inlet I and achieving effective cooling of the engine compartment.

The power transmission unit 5000 may be coupled to the frame 1000. The power transmission unit 5000 may be coupled to the power shaft 4800 of the loader 4000 passing through the third guide hole 1260 of the frame 1000 in a state of being disposed outside the frame 1000. The power transmission unit 5000 may be connected to an external power supply. The power transmission unit 5000 may rotate the power shaft 4800 of the loader 4000 by receiving electric power from the external power supply to generate power. The power transmission unit 5000 may include an actuator.

Hereinafter, a process of opening and closing the air inlet I by the air flap 2000 will be described.

FIGS. 8 to 10 are views illustrating a process in which an air flap is rotated.

Referring to FIGS. 8 to 10, the air flap 2000 may be disposed at a position where the air flap 2000 is rotatable to open the air inlet I when moved along the link 3000 and coupled to the loader 4000 and closes the air inlet I when moved along the link 3000 and separated from the loader 4000.

More specifically, referring to FIG. 8, first, in a state where the air flap 2000 closes the air inlet I, the first side protrusion 2420 of the air flap 2000 and the coupling shaft 4400 of the loader 4000 are spaced apart inside the first guide hole 1220, and the second side protrusion 2440 of the air flap 2000 is disposed in the first region 1242a of the straight portion 1242 of the first guide hole 1220. In this state, when power is generated from the power transmission unit 5000, the power shaft 4800 of the loader 4000 coupled to the power transmission unit 5000 is rotated. In this case, the power shaft 4800 may be rotated clockwise based on FIGS. 8 and 9, but is not limited thereto.

When the power shaft 4800 is rotated, the connecting portion 4600 and the coupling shaft 4400 are rotated at the same time together with the power shaft 4800. First, when the power shaft 4800 is rotated, the connecting portion 4600 close to the power shaft 4800 is rotated. When the connecting portion 4600 is rotated, the third side protrusion 3600 of the link 3000 rotatably supported by the connecting portion 4600 is pressed by the connecting portion 4600 and moved together with the connecting portion 4600. When the third side protrusion 3600 of the link 3000 is moved, the second side protrusion 2440 of the air flap 2000 accommodated in the support hole 3400 of the link 3000 is moved by being drawn by the second main body 3200 of the link 3000. In this case, the second side protrusion 2440 is moved from the first region 1242*a* to the second region 1242*b* of the straight portion 1242 of the second guide hole of the frame 1000.

When the second side protrusion 2440 of the air flap 2000 is moved, the first side protrusion 2420 of the air flap 2000 is also moved at the same time. In this case, the first side protrusion 2420 is moved toward the coupling shaft 4400 of the loader 4000 inside the first guide hole 1220 of the frame 1000. When the first side protrusion 2420 is moved inside the first guide hole 1220 and comes into contact with the coupling shaft 4400, as illustrated in FIG. 9, the first side protrusion 2420 is coupled to the coupling shaft 4400 of the loader 4000 and further movement thereof is blocked by the stopper 4900. Until this time, the first main body 2200 of the air flap 2000 is closing the air inlet I.

Referring to FIGS. 9 and 10, in this state, when power is continuously generated from the power transmission unit 5000, the power shaft 4800, the connecting portion 4600, and the coupling shaft 4400 are continuously rotated. In this case, since the coupling shaft 4400 is coupled to the first side protrusion 2420 of the air flap 2000, the first side protrusion 2420 is also continuously rotated together with the coupling shaft 4400. Accordingly, the support portion connected to the first side protrusion 2420 and the first main body 2200 integrated with the support portion start to rotate.

More specifically, since the first side protrusion 2420 is coupled to the coupling shaft 4400 and a rotation center of the first side protrusion 2420 coincides with the coupling shaft 4400, a rotation center of the second side protrusion 2440 may coincide with the first side protrusion 2420 and the coupling shaft 4400 of the loader 4000. Accordingly, the second side protrusion 2440 is rotated about the coupling shaft 4400 of the loader 4000 along the curved portion 1244 from the second region 1242*b* of the straight portion 1242 of the second guide hole 1240 of the frame 1000. When the second side protrusion 2440 is rotated along the second guide hole 1240 and the first main body 2200 of the air flap 2000 is rotated, the air inlet I is finally opened.

As described above, in the air flap apparatus for vehicles 1 according to one embodiment of the present invention, since the air flap 2000 is directly coupled to the loader 4000 and thus is rotated together with the loader 4000, the time for receiving the power generated by the power transmission unit 5000 is reduced, so that loss of the rotational force may be prevented. Therefore, compared to the air flap apparatus in the related art in which the air flap 2000 is rotated through the link 3000, the time for opening and closing the air inlet I is shortened, so that the cooling of the engine compartment may be performed quickly, thereby improving fuel efficiency.

In addition, in the air flap apparatus for vehicles 1 according to one embodiment of the present invention, since the air flap 2000 is directly coupled to the loader 4000 and thus is rotated together with the loader 4000, shaking of the air flap 2000 due to shaking of the link 3000 may be reduced. Accordingly, stability of opening and closing of the air inlet I of the air flap 2000 may be secured.

In addition, in the air flap apparatus for vehicles 1 according to one embodiment of the present invention, since the air flap 2000 is directly coupled to the loader 4000 and thus is rotated together with the loader 4000, power loss may be reduced compared to the air flap apparatus in the related art in which power generated in the power transmission unit 5000 is transmitted to the air flap 2000 through the link 3000. Therefore, over-operation of the power transmission unit 5000 for transmitting power is eliminated, so that the life of the power transmission unit 5000 may be maintained.

According to one embodiment of the present invention, since an air flap and a loader are directly connected, vibration of the air flap due to vibration transmitted to a link is reduced, so that the stability of the air flap can be secured.

In addition, according to one embodiment of the present invention, since the air flap and the loader are directly connected, a power transmission time is not delayed by the link, so that the over-operation of a power transmission unit can be prevented.

Although the embodiments of the present invention have been described above, it is understood that one ordinary skilled in the art can make various changes and modifications to the present invention without departing from the spirit and scope of the present invention as hereinafter claimed. Further, it should be construed that differences associated with such changes and modifications fall within the scope of the present invention defined by the accompanying claims.

What is claimed is:

1. An air flap apparatus for a vehicle, the air flap apparatus comprising:
  a frame disposed behind a grille of the vehicle, the frame including an air inlet;
  an air flap including a first main body for opening and closing the air inlet;
  links disposed at both sides of the air flap and coupled to the air flap; and
  a loader connected to the air flap through the links,
    wherein the air flap is disposed at
      a first position where the air flap is rotated to open the air inlet when the air flap is moved along the links and coupled to the loader, or
      a second position where the air flap is rotated to close the air inlet when the air flap is moved along the links and decoupled from the loader.

2. The air flap apparatus of claim 1, wherein the air flap includes:
  a first side protrusion in which a first coupling groove coupled to the loader is formed;
  a second side protrusion spaced apart from the first side protrusion and rotatably coupled to the links; and
  a connecting plate connecting the first side protrusion and the second side protrusion and having a second coupling groove connected to the first coupling groove.

3. The air flap apparatus of claim 2, wherein the loader includes:

a coupling shaft that is in contact with or separated from the first coupling groove in conjunction with movement of the links; and a power shaft disposed outside the coupling shaft and for rotating the coupling shaft.

4. The air flap apparatus of claim 3, wherein a rotation center of the air flap coincides with a rotation center of the coupling shaft when the first side protrusion of the air flap is coupled to the coupling shaft of the loader.

5. The air flap apparatus of claim 3, wherein the frame includes:

a first guide hole supporting the coupling shaft of the loader and guiding a movement direction of the first side protrusion of the air flap; and a second guide hole guiding a movement direction of the second side protrusion of the air flap.

6. The air flap apparatus of claim 5, wherein the second guide hole includes:

a straight portion guiding a straight movement of the second side protrusion of the air flap that moves in conjunction with the movement of the links in a state where the air flap closes the air inlet; and a curved portion connected to the straight portion and guiding a curved movement of the second side protrusion after the first side protrusion of the air flap is coupled to the coupling shaft of the loader.

7. The air flap apparatus of claim 6, wherein the straight portion of the second guide hole includes:

a first region in which the second side protrusion of the air flap is disposed in a state where the air flap closes the air inlet; and a second region connected to the curved portion of the second guide hole and disposed at a position where the first side protrusion of the air flap is coupled to the coupling shaft of the loader when the second side protrusion of the air flap is disposed.

8. The air flap apparatus of claim 3, wherein the loader includes a stopper formed integrally with the coupling shaft and blocking movement of the first side protrusion of the air flap.

9. The air flap apparatus of claim 2, wherein the links include:

a second main body;

a support hole disposed on one side of the second main body and supporting the second side protrusion of the air flap; and

12 a third side protrusion disposed on another side of the second main body and rotatably supported by the loader.

10. The air flap apparatus of claim 9, wherein the links are moved by being pressed by the loader that is rotated.

11. An air flap apparatus for a vehicle, the air flap apparatus comprising:

a frame including an air inlet;

an air flap for opening and closing the air inlet;

links respectively coupled to the air flap at opposing sides thereof;

a loader connected to the links;

a power transmission connectable to the loader; and a processor configured to control the power transmission to actuate the loader to move the links to move the air flap to open or close the air inlet, wherein, at a first position, the air inlet is opened by the air flap, and the air flap is coupled to the loader, and wherein, at a second position, the air inlet is closed by the air flap, and the air flap is decoupled from the loader.

12. The air flap apparatus of claim 11, further comprising a sensor for detecting air resistance at the air inlet.

13. The air flap apparatus of claim 12, wherein the processor is further configured to control the air flap to move between the first position and the second position based on at least one of the detected air resistance, moving speed of the vehicle, or a combination thereof.

14. The air flap apparatus of claim 13, wherein the air flap comprises:

a first side protrusion in which a first coupling groove coupled to the loader is formed;

a second side protrusion spaced apart from the first side protrusion and rotatably coupled to the link; and a connecting plate connecting the first side protrusion and the second side protrusion, the connecting plate including a second coupling groove connected to the first coupling groove.

15. The air flap apparatus of claim 14, wherein the loader comprises:

a coupling shaft detachably coupled to the first coupling groove; and a power shaft disposed outside the coupling shaft for rotating the coupling shaft.

* * * * *